United States Patent
Evans et al.

(10) Patent No.: US 12,270,241 B2
(45) Date of Patent: Apr. 8, 2025

(54) SYSTEM AND METHOD FOR CONTROLLING MOVABLE BARRIER OPERATION AT A SECURED PREMISES

(71) Applicant: Systems, LLC, Germantown, WI (US)

(72) Inventors: Patrick Evans, Elmhurst, IL (US); Michael Pilgrim, Oconomowoc, WI (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 198 days.

(21) Appl. No.: 17/973,246

(22) Filed: Oct. 25, 2022

(65) Prior Publication Data

US 2023/0046605 A1    Feb. 16, 2023

Related U.S. Application Data

(63) Continuation of application No. 17/005,710, filed on Aug. 28, 2020, now Pat. No. 11,492,838.
(Continued)

(51) Int. Cl.
*E05F 15/00* (2015.01)
*B65G 69/28* (2006.01)
*E05F 15/73* (2015.01)

(52) U.S. Cl.
CPC .......... *E05F 15/73* (2015.01); *B65G 69/2811* (2013.01); *E05Y 2400/30* (2013.01);
(Continued)

(58) Field of Classification Search
CPC .......... E05F 15/77; E05F 15/76; E05F 15/73; E05Y 2201/22; E05Y 2400/30;
(Continued)

(56) References Cited

U.S. PATENT DOCUMENTS 6,092,338 A     7/2000  Crowner
8,307,956 B2 *  11/2012 Andersen ............. B65G 69/005
                                              188/4 R
(Continued)

OTHER PUBLICATIONS

4Sight Internet Brochure; http://4sightsolution.4frontes.com/document/4C-4S00-0809; Carrollton, TX; 2009; 5 pages.
(Continued)

*Primary Examiner* — Chi Q Nguyen
(74) *Attorney, Agent, or Firm* — Dority & Manning, P.A.

(57) ABSTRACT

In one aspect, a method is provided for controlling access to a facility including a movable barrier and a plurality of loading docks. The method includes receiving, from a user device associated with a vehicle, a check-in communication that includes a check-in identifier. The method includes receiving a verification communication that verifies a presence of the vehicle relative to a sensor associated with the movable barrier. The method further includes causing a movable barrier operator associated with the movable barrier to move the movable barrier between closed and open positions in response to the check-in identifier indicating authorization to access the facility and in response to receiving the verification communication. Further, the method includes selecting a particular loading dock from the plurality of loading docks and communicating a loading dock identification representative of the particular loading dock to the user device to direct the vehicle to the particular loading dock.

11 Claims, 4 Drawing Sheets

Related U.S. Application Data

(60) Provisional application No. 62/914,745, filed on Oct. 14, 2019, provisional application No. 62/900,569, filed on Sep. 15, 2019.

(52) U.S. Cl.
CPC ....... *E05Y 2400/44* (2013.01); *E05Y 2400/45* (2013.01); *E05Y 2400/856* (2013.01); *E05Y 2900/11* (2013.01); *E05Y 2900/40* (2013.01)

(58) Field of Classification Search
CPC ............. E05Y 2900/11; E05Y 2400/42; E05Y 2400/856; E05Y 2400/45; E05Y 2900/40; E05Y 2400/44; B65G 69/2811; B65G 69/2882; B65G 2203/041; B65G 69/003
See application file for complete search history.

(56) References Cited

U.S. PATENT DOCUMENTS

| | | | |
|---|---|---|---|
| 8,587,404 | B2 | 11/2013 | Laird |
| 9,141,099 | B2 | 9/2015 | Cate |
| 9,756,233 | B2 | 9/2017 | Lee |
| 10,628,786 | B2 | 4/2020 | Millhouse |
| 11,225,825 | B2 | 1/2022 | McKenna |
| 11,319,173 | B2* | 5/2022 | Valentin ............... B65G 69/005 |
| 11,492,838 | B2 | 11/2022 | Evans |
| 11,702,304 | B2* | 7/2023 | Biasutto ................... G08B 5/38 |
| | | | 414/809 |
| 2008/0127435 | A1* | 6/2008 | Maly .................. B65G 69/2882 |
| | | | 14/71.1 |
| 2010/0242369 | A1 | 9/2010 | Laird |
| 2010/0260586 | A1* | 10/2010 | Manone ............... B65G 69/005 |
| | | | 414/401 |
| 2014/0129606 | A1 | 5/2014 | Cate |
| 2015/0013227 | A1 | 1/2015 | Lamb |
| 2017/0101278 | A1* | 4/2017 | Stone ..................... B65G 69/00 |
| 2018/0247475 | A1 | 8/2018 | Archbold |
| 2019/0002216 | A1* | 1/2019 | Walford ............ B65G 69/2882 |
| 2019/0066033 | A1 | 2/2019 | Mains, Jr. |
| 2019/0144218 | A1* | 5/2019 | Hoofard .................. G06F 3/048 |
| | | | 52/173.2 |
| 2020/0240198 | A1 | 7/2020 | Cate |
| 2021/0189785 | A1 | 6/2021 | Axtolis |

OTHER PUBLICATIONS

U.S. Appl. No. 17/005,710; Non-Final Rejection mailed Jan. 21, 2022; (pp. 1-8).
U.S. Appl. No. 17/005,710; Notice of Allowance and Fees Due (PTOL-85) mailed Jul. 7, 2022; (pp. 1-9).

* cited by examiner

SYSTEM AND METHOD FOR CONTROLLING MOVABLE BARRIER OPERATION AT A SECURED PREMISES

CROSS-REFERENCE TO RELATED APPLICATIONS

This is a continuation application of U.S. patent application Ser. No. 17/005,710, filed Aug. 28, 2020, entitled SYSTEM AND METHOD FOR CONTROLLING MOVABLE BARRIER OPERATION AT A SECURED PREMISES, issued on Nov. 8, 2022 as U.S. Pat. No. 11,492,838, which claims the benefit of U.S. Provisional Patent Application No. 62/900,569, filed Sep. 15, 2019, entitled SYSTEM AND METHOD FOR CONTROLLING MOVABLE BARRIER OPERATION AT A SECURED PREMISES, and claims the benefit of U.S. Provisional Patent Application No. 62/914,745, filed Oct. 14, 2019, entitled SYSTEM AND METHOD FOR CONTROLLING MOVABLE BARRIER OPERATION AT A SECURED PREMISES, which are all hereby incorporated by reference herein in their entireties.

FIELD

The present disclosure relates to controlling movable barrier operators, and more particularly, to controlling access to a facility having a movable barrier and a plurality of loading docks.

BACKGROUND

Movable barrier operators of various kinds are used to control the opening and closing of gates, doors, and other barriers that permit access to secured premises and/or enclosed spaces. Example movable barrier operators include gate operators, rolling shutter operators, garage door operators, and the like.

Commercial and industrial facilities may have a fence or wall around the facility and one or more gates or other barriers for controlling access to the facility. Examples of such facilities include warehouses, factories, logistic centers, and assembly plants. Typically, when a vehicle such as a semi-trailer truck arrives at such a facility, the vehicle operator must "check in" at a gate before the vehicle is permitted to enter the facility. If the vehicle is authorized, an employee at the gate will open the gate. This check-in process may be time consuming, resulting in increased vehicle idle time at the perimeter of the facility. Increased idle time reduces the efficiency of both the vehicle operator and the facility.

Upon check-in, a vehicle may be directed by the employee at the gate to a loading dock to load or unload freight. In some instances, the loading or unloading of freight may be delayed upon arrival of the vehicle at the loading dock. Such a delay may occur, for example, when facility personnel are not available at the loading dock at the time the vehicle arrives at the loading dock. Thus, conventional approaches for logistics at a facility may result in idle time of vehicles at the gate of the facility as well as detention time and/or dwell time within the facility. As can be appreciated, facility inefficiencies such as the foregoing-mentioned idle time, detention time and dwell time may result in lost time to carriers (or vehicle drivers/operators) and additional cost to shippers or receivers.

Another problem with conventional approaches is that there is often no way for a trucking company to independently confirm the time a truck has arrived or departed from a facility. The employee of the facility such as a spotter or a guard at the entry/exit gate may keep a paper record of the trucks entering and exiting the facility, but the paper record may be lost or tampered with. A related problem encountered by trucking companies is that the contents of trailers are often tracked using paper bills of lading, which create delays and difficulties in reconciliation including freight tracking and billing.

Figure 1:
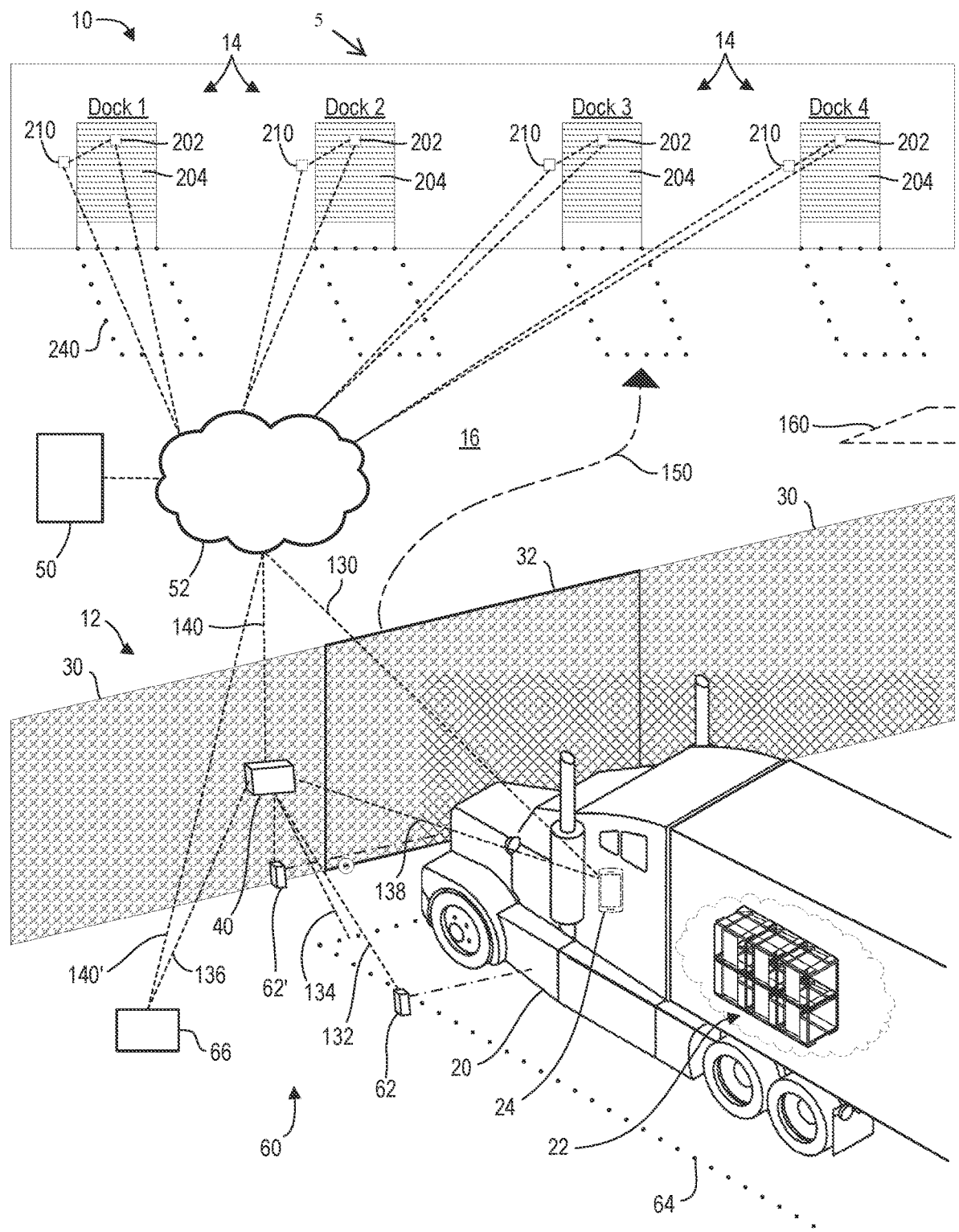
FIG. 1 is an example schematic diagram showing a movable barrier operator for controlling access to a facility, dock door operators for controlling access to loading docks of the facility, and a remote server computer for controlling the movable barrier operator and the dock door operator.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be employed for particular applications or implementations.

DETAILED DESCRIPTION

In one aspect of the present disclosure, a system is provided for controlling access to a facility that includes a movable barrier and a plurality of loading docks. The system includes a remote computer, such as a remote server computer, that may be configured to communicate control commands to a movable barrier operator to effect movement of the movable barrier. The remote server computer may further be configured to communicate control commands to a dock door operator to effect movement of an associated loading dock door.

More particularly, the remote server computer may perform at least a portion of a check-in process upon a vehicle arriving at a movable barrier of the facility. The check-in process may include the remote server computer receiving a check-in communication from a user device associated with the vehicle. The check-in process further includes verifying a presence of the vehicle at the movable barrier; for example, as detected by one or more sensors proximate the movable barrier. The remote server computer receives a verification communication indicating the presence of the vehicle at the movable barrier upon the one or more sensors detecting the vehicle. After receiving both the check-in communication and the verification communication indicating the presence of the vehicle, the remote server computer communicates a control command to the movable barrier operator and/or the user device to permit movement (e.g., opening) of the movable barrier. As such, the vehicle is granted access to the secured premises of the facility.

In one approach, the remote server computer may select a particular loading dock from the plurality of loading docks. The remote server computer may further communicate a loading dock identification representative of the particular loading dock to the user device to direct the vehicle to the particular loading dock. In an optional approach, the remote server computer may cause the particular loading dock to configure at least one loading dock component to facilitate receiving the vehicle.

The remote server computer may also perform at least a portion of a dock arrival process upon the vehicle arriving at the particular loading dock area. The dock arrival process may include the remote server computer receiving a dock arrival communication from the user device. The dock arrival process further includes verifying a presence of the vehicle at the particular loading dock area; for example, as detected by one or more sensors disposed proximate the loading dock. The remote server computer receives a dock verification communication indicating the presence or absence of the vehicle at the particular loading dock area upon the one or more sensors detecting the vehicle. Upon receiving both the dock arrival communication and the dock verification communication indicating the presence of the vehicle, the remote server computer transmits a control command to a dock door operator to effect movement (e.g., opening) of the dock door. As such, the vehicle is granted access to an interior of the loading dock.

The remote sever computer may also perform at least a portion of a check out process that includes initiating billing upon the vehicle being partially or completely unloaded at the facility. The check out process may also include the remote server receiving bill of lading information if the vehicle has been loaded with new freight. The check out process may involve the user device automatically, or in response to user input, communicating a notification that the vehicle is in route to a subsequent delivery or that the driver is available to be assigned to a new load location. The check out process may also include the remote server receiving information indicative of operational efficiency that may in certain instances represent charges/fees directed to the shipping/receiving facility and/or to the carrier or vehicle operator; e.g., the duration of the time from the user device causing opening of the movable barrier until the vehicle arrives at the dock, the duration of time the vehicle is at the dock which if greater than a predetermined duration may factor into a detention fee to be paid by the facility to the carrier or vehicle operator, and/or the duration of time the vehicle takes to check out at the gate after unloading at the dock.

Referring now to FIG. 1, a facility 10 includes a perimeter barrier 12 that inhibits access to a secured premises 16. The facility 10 may be, for example, a warehouse, a shipping facility, an assembly plant, and the like. The facility 10 may include plurality of loading docks 14 located within the secured premises 16 of the facility 10. A vehicle 20, which may be a tractor-trailer, flatbed truck, or cargo van as some examples, accesses the loading docks 14 via a movable barrier 32, such as a gate, of the perimeter barrier 12 to load or unload freight 22 at the loading docks 14. As discussed in greater detail below, a user (e.g., the operator) of the vehicle 20 may operate one or more user devices 24 upon arrival at the perimeter barrier 12 to initiate opening of the movable barrier 32, and may operate the user device 24 upon arrival at a loading dock 14 to initiate opening of a movable barrier of the loading dock 14, such as a loading dock door 204.

The perimeter barrier 12 shown in FIG. 1 is in the form of a chain link fence having fixed barrier portions 30 and the movable barrier 32 that shifts relative to the fixed barrier portions 30. The movable barrier 32 shown in FIG. 1 may include rollers that travel along a track as the movable barrier 32 is shifted relative to the fixed barrier portions 30. In other embodiments, the movable barrier 32 may be include a swinging gate or door, a sectional garage door or one-piece "California" garage door, a roller door, a movable arm, tire spikes, or another suitable barrier for controlling access to the secured premises 16.

The facility 10 includes a system 5 for selectively permitting access to the facility 10. The system 5 includes a movable barrier operator 40, such as a gate operator, operatively connected to the movable barrier 32 to move the movable barrier 32 between a closed position and an open position. The movable barrier operator 40 may include or be in communication with an access control apparatus such as a telephone entry system-like panel that is configured to manage or control operation of the movable barrier operator 40. The access control apparatus may be configured with audio and/or video communication hardware such as a microphone, speaker, and/or camera such that the driver/operator of the vehicle may request access from an individual, e.g. a security guard, who is remote from the entrance or facility 10. Additionally or alternatively, the access control apparatus may include a credential receiver (e.g., biometric scanner, numeric keypad, card reader, etc.) that may authenticate, authorize or verify a user device 24 or user thereof. The system 5 includes a remote server computer 50 configured to communicate with the movable barrier operator 40 over a network 52. The remote server computer 50 may include one or more computers connected to provide operability as discussed below.

The remote server computer 50 is also configured to communicate with one or more sensors, indicated generally at 60. The sensors 60 may be located at the perimeter barrier 12 of the facility 10. In one embodiment, the sensors 60 communicate with the movable barrier operator 40, which communicates sensor data to the remote server computer 50. The communications between the sensors 60 and the movable barrier operator 40 may include wired and/or wireless approaches. In one embodiment, signals are communicated between the particular sensor 60 and the movable barrier operator 40 via another device (e.g., a proxy or a router).

The sensors 60 may be a presence detector that is configured to detect presence of a vehicle 20. For example, the sensors 60 may include a photo beam system 62 and/or a loop detector 64. Other presence sensors, indicated generally at 66, can include one or more of a passive infrared detector, camera, a radio frequency receiver, a short-range (e.g., Bluetooth) receiver, a magnetic detector, a light or sound-based time-of-flight sensor, a capacitance detector, sound detector, and an optical detector (e.g., a camera). The sensors 60 may inform the movable barrier operator 40 and/or the remote server computer 50 of the presence of a vehicle 20 at the movable barrier 32 of the facility 10.

Figure 2:
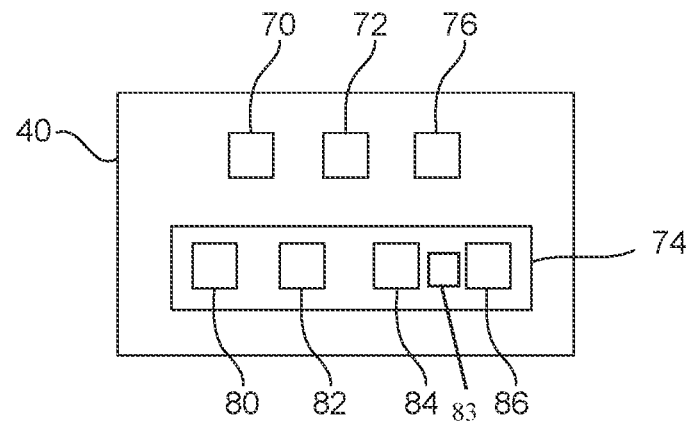
FIG. 2 is an example block diagram of the movable barrier operator of FIG. 1.

Referring to FIG. 2, the movable barrier operator 40 may include a motor 70, a memory 72, and communication circuitry 74. The movable barrier operator 40 may further include processing circuitry 76 that is operatively coupled to one or more of the motor 70, the memory 72, and the communication circuitry 74. The motor 70 is configured to be connected to a movable barrier (e.g., movable barrier 32) to move the movable barrier between open and closed positions. The memory 72 may store identification and security (e.g. rolling code) information for authorized remote controls.

The communication circuitry 74 may be configured to receive wired and/or wireless communications from a local device (such as a local transmitter or local sensor) and/or a remote device (such as the remote server computer 50). In this way, the communication circuitry 74 may include a radio frequency signal receiver or transceiver 80 that may receive a command signal from a radio frequency signal transmitter to change the state of the movable barrier 32.

The communication circuitry 74 may further include a network interface 82. The network interface 82 may be configured to communicate with the remote server computer 50 over the network 52, as shown in FIG. 1. The network interface 82 may communicate with the network 52 via wired and/or wireless approaches, such as a wireless gateway or access point, e.g. a Wi-Fi router. The network interface 82 may receive a state change command from the remote server computer 50 (e.g., via the network 52) to cause the movable barrier operator 40 to change the state (e.g., a closed position to an open position or vice versa) of the movable barrier 32. The network interface 82 may also communicate information to the remote server computer 50. Such information may include information identifying the vehicle 20, a user (e.g., driver and/or passenger) associated with the vehicle 20, the freight 22 of the vehicle 20, information pertaining to the movable barrier 32, information pertaining to one or more sensors 60 associated with the movable barrier 32, or any combination thereof. The communication circuitry 74 may also include a long-range wireless transceiver 83 that may communicate with other devices. For example, the communication circuitry may receive communications from one or more devices such as sensors having WiMax or LoRa-based communication operability, such as a V2X (vehicle to anything) sensor. Such sensors may be mounted, for example, to a stoplight or stop sign at an intersection near the facility 10 and may detect a beacon signal from the user device 24 or other component of the vehicle. The movable barrier operator 40 may thereby be able to determine the vehicle 20 is nearby, and may further be able to communicate such information to the remote server computer 50.

The communication circuitry 74 may further includes a short-range wireless transceiver 84. In one example, the short-range wireless transceiver 84 may be configured to receive a check-in signal directly from the user device 24 over a short-range wireless protocol, such as Bluetooth, near-field communication (NFC), or infrared. The communication circuitry 74 may also include a wired communication interface 86 for communicating with one or more devices (e.g., a local sensor 60).

Figure 3:
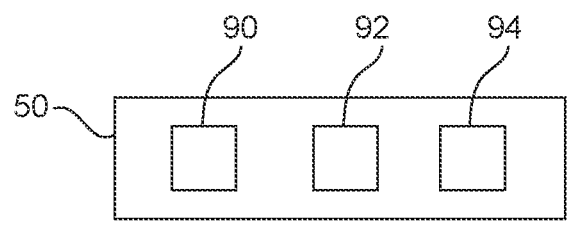
FIG. 3 is an example block diagram of the remote server computer of FIG. 1.

Referring to FIG. 3, the remote server computer 50 may facilitate operation of one or more movable barrier operators 40 at the facility 10. For example, the remote server computer 50 may communicate control commands (e.g., open, close, start, stop, etc.) to the movable barrier operator 40 (see FIG. 1) of the facility 10. Additionally or alternatively, the remote server computer 50 may communicate control commands to one or more dock door operators 202 at the loading docks 14 to operate associated loading dock doors 204, as discussed in greater detail below. To facilitate operation of the movable barrier operator 40, the remote server computer 50 includes a network or communication interface 90 configured to communicate via the network 52 with movable barrier operators 40 at the facility 10. The communication interface 90 is further configured to communicate with the user device 24 via the network 52.

The remote server computer 50 also includes a non-transitory, computer-readable medium such as a memory 92 for storing information. For example, the memory 92 may store facility information such as facility identification, facility location, facility contact information, facility history information, etc. Schedule information, such as authorized arrival times and departure times for vehicles 20, may also be stored in the memory 92. The memory 92 may also store transport logs, which may include actual arrival times and/or actual departure times, which are recorded when the user utilizes the user device 24 to operate the movable barrier operator 40. The ability of the system 5 to determine actual arrival and departure times based on operation of the movable barrier operator provides independent verification and improved freight tracking accuracy over relying on paper records. The memory 92 may also store barrier operator information, which may include the times of operation of a given barrier operator, a number of actuation events for a given barrier operator (e.g., lifetime actuation events, or actuation events since a last maintenance operation). The memory 92 may store information from the sensors 60 at a given facility 10 such as presence detections, times of presence detections, and/or estimated accuracy of detections. The memory 92 may also store user information, which may include user identification information, account information, contact information, user histories, still or moving images of the user, vehicle, etc., and/or user notes. The memory 92 may further store freight information such as freight identifiers, freight tracking information, freight notes, bills of lading, and/or packaging slips. The memory 92 may also store loading dock information, such as the status of dock door operators 202, the position of a truck restraint 226 (see FIG. 5), height of a dock leveler 224, and/or identifications of sensors and/or configurable devices at a given loading dock.

The remote server computer 50 also includes a processor 94 that is operatively coupled to the communication interface 90 and the memory 92. The processor 94 may determine whether a first condition is satisfied (e.g., whether the vehicle 20 has arrived at the facility 10), and may further determine whether a second condition is satisfied (e.g., whether the vehicle 20 is authorized to access the facility 10 at that time), as discussed in greater detail below. Upon satisfaction of both conditions, the processor 94 may communicate a control command, via the communication interface 90, to an operator (e.g., movable barrier operator 40 and/or dock door operator 202) at the facility 10 to operate a movable barrier. In other instances the remote server computer 50 may, alone or in conjunction with another apparatus, permit access to the facility 10 based on satisfaction of a single condition or a plurality of conditions. As another example, the remote server computer 50 communicates a token to the user device 24 and the user device 24 communicates a control command, including the token, to the movable barrier operator 40 to cause the movable barrier operator 40 to change the state of the movable barrier 32. Furthermore, the processor 94 may communicate a configuration command to effect a configuration of one or more loading dock devices at the loading docks 14, as discussed in greater detail with respect to FIG. 4.

The remote server computer 50 may take a variety of embodiments. For example, the remote server computer 50 may be an "off-site" server computer that is not located at the facility 10. In another embodiment, the remote server computer 50 is an "on-site" server computer that is located at the facility 10. For example, the remote server computer 50 may be located in an office of the facility 10.

Figure 4:
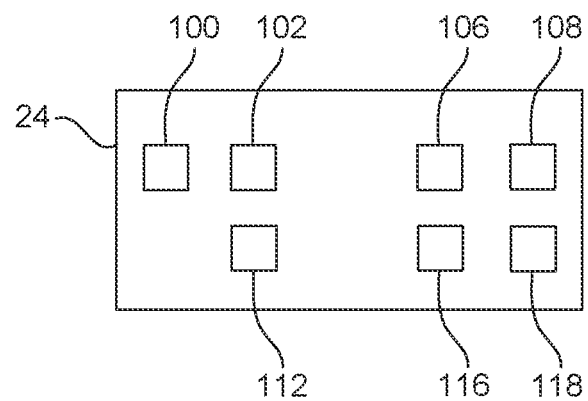
FIG. 4 is an example block diagram of the user device of FIG. 1.

Referring to FIG. 4, an example of the user device 24 for use by an occupant of the vehicle 20 is shown. The user device 24 may include one or more of a user input 100, such as a touch screen, keypad, speaker, microphone, heads-up display, augmented reality display, and communication circuitry 102 for communicating with a remote device (e.g., remote server computer 50). The communication circuitry 102 may include a long-range wireless communication interface, such an interface that communicates with cellular networks (3G, 4G, 4G LTE, 5G), WiMax networks, and/or LoRa networks as some examples. The communication circuitry 102 may also include a short-range wireless communication interface, such as an interface that communicates using Bluetooth, Wi-Fi, and/or ZigBee. The user device 24 may also include a memory 106, a power source 108 such as a battery or an electrical power source in a vehicle, location circuitry 112 such as a global navigation satellite system (e.g., GPS) transceiver, and an optical device 116 such as a camera and/or a barcode scanner. The user device 24 may further include a processor circuit 118 operatively coupled to the other components of the user device 24 for controlling the operation thereof.

In one aspect, the user device 24 may be a personal user device, such as a smartphone, tablet computer, personal computer, or wearable device (e.g., smartwatch). As another example, the user device 24 is a vehicle-integrated user device, such as a human machine interface of the vehicle 20. Examples of human machine interfaces include a vehicle center stack, a dashboard display, a navigation unit, a telematics unit, an infotainment unit, and a heads-up display system.

Referring again to FIG. 1, an arrival or check-in process will now be described. Upon arriving at the facility 10 (e.g., at the perimeter barrier 12 of the facility 10), at least a portion of a check-in process may be performed at the user device 24. During the check-in process, a check-in communication 130 is transmitted from the user device 24 to the remote server computer 50 via the network 52. According to one aspect, the check-in process is initiated when a user, such as the vehicle operator, opens and/or controls an application of the user device 24. For example, the vehicle occupant may provide an input at the user input 100, which may include a touch screen, to request a change of state of the movable barrier 32. The processor circuit 118 is configured to cause the communication circuitry 102 to communicate the check-in communication 130 to the remote server computer 50. In this way, the user may manually effect transmission of the check-in communication 130 from the user device 24 upon arriving at the facility 10.

According to another aspect, the user device 24 may automatically effect transmission of the check-in communication 130 from the user device 24. In this aspect, transmission of the check-in communication 130 may be effected in response to the processor circuit 118 determining (e.g., via location circuitry 112) that the user device 24 is at a predetermined geolocation or proximity relative to the facility 10 (e.g., at the movable barrier 32). As another example, the user device 24 may automatically effect transmission of the check-in communication upon the user device 24 receiving a beacon signal or light pattern from the movable barrier operator 40 or, as previously mentioned, an access control apparatus that is associated or in communication with the movable barrier operator 40.

In one embodiment, the check-in communication 130 is communicated directly to the remote server computer 50 via the network 52. In another approach, the check-in communication 130 is communicated to the movable barrier operator 40 (via signal 138), which relays the check-in communication 130 to the remote server computer 50 via the network 52. In such an approach, the movable barrier operator 40 may function as a terminal for relaying information (e.g., check-in information) to the remote server computer 50.

The check-in communication 130 may include location information. For example, the check-in communication 130 may include a location associated with the vehicle 20 (e.g., as informed by the location circuitry 112 of the user device 24). Additionally or alternatively, the check-in communication 130 may include a location of a movable barrier 32 or movable barrier operator 40 associated with the location of the vehicle 20.

Additionally or alternatively, the check-in communication 130 may include a check-in identifier. The check-in identifier may include information pertaining to at least one of the user, the vehicle 20, the user device 24, and freight 22 transported (or to be transported) by the vehicle 20. Information pertaining to the user may include a user identifier (e.g., name, employer, user ID). Information pertaining to the vehicle 20 may include a vehicle identifier (which may include a tractor identifier and/or a trailer identifier), vehicle owner information, vehicle schedule information (e.g., prior schedule information and/or future schedule information), and/or vehicle characteristic. A vehicle characteristic may include, for example, a height of the vehicle 20, a height and/or type of a rear impact guard of the vehicle 20, and/or an identifier associated with the vehicle 20. Information pertaining to the user device 24 may include a globally unique ID of the user device 24. Freight-related information may include a name and/or address of the shipper, a name and/or address of the recipient, dates (e.g., pickup and/or delivery dates), locations (e.g., pickup and/or delivery locations), purchase orders or reference numbers, description of the freight (e.g., number of shipping units, dimensions, weight, materials, packaging, freight class, hazardous material designation, storage requirements such as temperature or environmental requirements, etc.), instructions, or combinations thereof. Other freight-related information may include stock keeping unit (SKU) and/or food lot numbers.

The check-in communication 130 may include information relating to image data such as one or more of pictures or video captured, for example, by a sensor 60 or by the optical device 116 of the user device 24. The pictures and/or video may include pictures and/or video of an identifier of the vehicle 20 such as a trailer number, a license plate, a barcode of the trailer, the user driver's license, a bill of lading, and/or freight 22 transported (or to-be-transported) by the vehicle 20.

The user device 24 may receive the information for the check-in identifier in a number of ways. For example, the user may open an application on the user device 24 and enter a user name and password using the user interface 100. The user device 24 has stored thereon or retrieves from the remote server computer 50 profile information for the user such as driver's license number, trucking company, and insurance information as some examples. When the vehicle 20 picks up a trailer at a first location to deliver to the facility 10, the user device 24 receives a digital bill of lading and/or packing slip from the first location which includes freight information (e.g., SKUs, lot numbers, pallet numbers). The user utilizes the optical device 116 of the user device 24 to take a picture of a trailer number, barcode, or other machine-readable indicium of the trailer. The picture evidences that the user is actually picking up the trailer. The user device 24 communicates the received information to the remote server computer 50, such as once the vehicle 20 leaves the remote facility, during transit to the facility 10, and/or upon arrival at the facility 10. The user device 24 may also provide information to the remote server computer 50 during travel, such as location data, which permits real-time tracking of the vehicle 20.

In some embodiments, the freight information received by the user device 24 may be directly communicated to the remote server computer 50. Alternatively or additionally, the freight information may be recorded using a digital distributed ledger system, e.g., private blockchain. The remote server computer 50 and/or distributed ledger may maintain a detailed record of each shipped product as the product travels from facility to facility and eventually to a point of sale (as an example). The detailed record facilitates accurate supply chain tracking and traceability, such as for product recalls.

As discussed, the check-in communication 130 may be transmitted to remote server computer 50 via the network 52. Upon receiving the check-in communication 130, the remote server computer 50 performs an authorization check based at least in part on the check-in identifier. For example, the remote server computer 50 may determine whether the vehicle 20 is authorized to access the facility 10. The determination may include determining whether the user, vehicle 20, and/or user device 24 are authorized to access the facility 10; for example, within a particular date range, on a particular day, within a particular time range, and/or at a particular time.

In one example, the check-in communication 130 includes a vehicle identifier, and the memory includes a schedule indicating a particular time that the vehicle 20 is authorized to arrive at the facility 10. In this example, the remote server computer 50 may determine whether the vehicle 20 is authorized to access the facility 10 at the time of the check-in communication 130. If the vehicle 20 is not authorized to access the facility 10 at the time of the check-in communication 130, the remote server computer 50 may communicate with the user device 24 to inform the vehicle occupant that the vehicle 20 is not authorized to access the facility 10 at that time. The communication with the user device 24 may further inform the vehicle occupant of the time (or range of times) that the vehicle 20 is authorized to access the facility 10.

If the vehicle 20 is not authorized to access the facility 10, such as if there are no open loading docks, the remote server computer 50 may communicate an instruction to the user via the user device 24 to park the trailer of the vehicle 20 outside of the facility. This may occur, for example, if the user is delivering a trailer to the facility 10 outside of normal business hours.

At the time of the check-in communication 130, the remote server computer 50 may perform a presence verification process. For example, the remote server computer 50 may communicate with one or more sensors 60 at the facility 10 to verify the vehicle 20 has arrived at the facility 10.

In one embodiment, the remote server computer 50 may communicate with the movable barrier operator 40 for verification of vehicle presence at the movable barrier 32. The movable barrier operator 40 may be informed of a presence of the vehicle 20 at the movable barrier 32 through various approaches. In one approach, the movable barrier operator 40 communicates with one or more sensors 60 located at the movable barrier 32 of the facility 10. As such, the sensors 60 may report the detected presence of the vehicle 20 to the movable barrier operator 40.

In one example, verification of the presence of the vehicle 20 may include detecting a break in an optical beam transmitted by a photo beam system 62 that is in communication with the movable barrier operator 40, as indicated by signal 132. In another example, verification of the presence of the vehicle 20 may include detecting a change in the base frequency of an electrical signal transmitted by a loop detector 64 that is in communication with the movable barrier operator 40, as indicated at signal 134. The one or more sensors 60 may include other sensors 66 that are in communication with the movable barrier operator 40, as indicated at signal 136, may be used for detecting the presence of the vehicle 20 at the movable barrier 32. As discussed, such sensors 66 may include one or more of a passive infrared detector, a radio frequency receiver, a short-range (e.g., Bluetooth) receiver, a magnetic detector, a capacitance detector, a time-of-flight sensor, sound detector, and an optical detector (e.g., a camera).

In another approach, the movable barrier operator 40 is configured to directly detect a presence of a vehicle 20. For example, the communication circuitry 74 of the movable barrier operator 40 may communicate with the user device 24, as indicated at signal 138. Such communication may be, for example, via a short-range (e.g., Bluetooth) protocol.

The sensors 60 inform the movable barrier operator 40 of a presence or absence of a vehicle 20 at the perimeter barrier 12. The movable barrier operator 40 is configured to transmit a verification communication 140 to the remote server computer 50. The verification communication 140 may include, for example, information identifying the movable barrier operator 40 such as device ID, gate ID, and/or location (e.g., street name, latitude and longitude). The verification communication 140 may also include information detected by the sensors 60, such as an identification number or barcode of the trailer and/or tractor.

In still another embodiment, one or more of the sensors 60 may communicate a verification communication to the remote server computer 50 (e.g., via the network 52). For example, as shown in FIG. 1, a sensor 66 may communicate a verification communication 140' to the remote server computer 50. Additionally or alternatively, one or both of the photo beam system 62 and the loop detector 64 may communicate a verification communication to the remote server computer 50. In this manner, one or more of the sensors 60 may include a long-range wireless communication interface and/or a wired communication interface.

In one approach, the one or more sensors 60 may continuously or periodically monitor for the presence of a vehicle 20. In another approach, the one or more sensors 60 may enter a "sleep" mode, and may check for the presence of a vehicle 20 in response to a "wake" signal transmitted from the movable barrier operator 40, the remote server computer 50, and/or the user device 24. For example, the movable barrier operator 40 may be configured to transmit a wake signal to the sensor 60 in response to the movable barrier operator 40 receiving a vehicle presence query from the remote server computer 50.

The various approaches described herein allow for the remote server computer 50 to be informed of a presence or absence of a vehicle 20 at the movable barrier 32 of a facility 10. For example, the remote server computer 50 may receive an affirmative indication (e.g., via verification communication 140, 140') of a presence of the vehicle 20, or an affirmative indication of the absence of the vehicle 20 (e.g., as reported by a sensor 60 that does not detect the vehicle 20). Additionally or alternatively, the remote server computer 50 may infer an absence of the vehicle 20 in response to not receiving a verification communication 140, 140'.

Upon the remote server computer 50 determining the check-in identifier of the check-in communication 130 indicates authorization of the vehicle 20 to access the facility 10, and after receiving the verification communication 140, 140', the remote server computer 50 is configured to cause the movable barrier operator 40 to move the movable barrier 32 between the closed position (shown in FIG. 1) to an open position whereby the vehicle 20 may pass into the secured premises 16. The remote server computer 50 may cause the movable barrier operator 40 to move the movable barrier 32 by communicating a control command to the movable barrier operator 40. The "entrance time," which corresponds to the movable barrier operator 40 moving the movable barrier 32 between closed and open positions, may be stored in a memory at one or both of the movable barrier operator 40 (memory 72) and the remote server computer 50 (memory 92). The entrance time may be utilized as an electronic signature to check in (entry) and check out (exit) a vehicle 20 from a geographic location, facility gate, and/or dock.

Further, the entrance time recorded at the memory 72, 92 provides an independently obtained time the vehicle 20 entered the facility 10 which improves the accuracy of tracking movement of the vehicle 20. The remote server computer 50 may communicate a notification to a manager or management computer system of the facility 10 that indicates the vehicle 20 has entered at the movable barrier 32. The manager or management computer system may quickly assign staff to prepare to unload and/or load the vehicle 20.

The check-in process and the presence verification process, including operations thereof, may be performed in any suitable order. As such, the remote server computer 50 may cause the movable barrier operator 40 to move the movable barrier 32 in response to receiving the verification communication 140, 140' after having previously received the check-in communication 130. In another example, the remote server computer 50 may cause the movable barrier operator 40 to move the movable barrier 32 in response to receiving the check-in communication 130 after having previously received the verification communication 140, 140'. In the latter approach, the remote server computer 50 may continuously or periodically receive a verification communication 140, 140' such that the remote server computer 50 is aware of the presence of the vehicle 20 at the movable barrier 32 prior to receiving the check-in communication 130 from the user device 24.

The remote server computer 50 may receive confirmation of passage of the vehicle 20 through the opened movable barrier 32. For example, photo beam system 62, which previously had an interrupted photo beam while the vehicle 20 was positioned outside of the movable barrier 32, may report a series of interruptions as the wheels of the vehicle 20 travel through the photo beam. In another example, a forward photo beam system 62', which previously had an uninterrupted photo beam while the vehicle 20 was positioned outside of the perimeter barrier 12, may report an interrupted photo beam. As another example, the sensor 60 may include a camera having image recognition operability to detect the vehicle 20 entering the facility 10.

Prior to, after, or concurrent with the opening of the movable barrier 32, the remote server computer 50 may communicate a loading dock identification to the user device 24 (e.g., to the communication circuitry 102 of the user device 24). The loading dock identification may identify a particular loading dock from among the plurality of loading docks 14. For example, the loading dock identifier may instruct the vehicle occupant to direct the vehicle 20 to "Dock 3" of the facility 10, as indicated at arrow 150. Alternatively or additionally, the loading dock identification may include navigation information, such as turn-by-turn directions or a map, for the user device 24 to present to the user.

In one embodiment, a particular loading dock may be selected based at least in part on dock availability. For example, "Dock 3" may be the only available loading dock or is the only loading dock with necessary space availability. Alternatively or additionally, a particular loading dock may be selected based at lest in availability of at least one of staff and equipment (e.g., hazardous or cold storage).

In another embodiment, a particular loading dock may be selected based at least in part on freight to be delivered by the vehicle 20 or picked up by the vehicle 20. For example, "Dock 3" is the only loading dock equipped to handle hazardous material, or has the capability for storing the freight in the necessary storage environment (temperature, humidity, etc.). In another aspect, a particular loading dock may be selected based at least in part on dock personnel at the facility 10, e.g., dock workers are available at "Dock 3" but not at "Dock 1". In another aspect, a particular loading dock may be selected based at least in part on loading dock accessories, e.g., a dock leveler is provided at "Dock 3" but not at "Dock 2". In another aspect, a particular loading dock may be selected based at least in part on usage patterns of the plurality of loading docks. For example, the dock door operator associated with "Dock 3" may have a fewer number of operation events, e.g., "open" or "close," than the dock door operator associated with "Dock 4." In another aspect, a particular loading dock may be selected based at least in part on a maintenance schedule of the plurality of loading docks. For example, "Dock 1" may be scheduled for maintenance while the vehicle 20 is expected to be at the facility 10, so use "Dock 3" instead. Information used to assign a particular loading dock may be determined, for example, from a bill of lading or vehicle information (e.g., trailer number) that was communicated during the check-in process.

If no loading dock is available, but the vehicle 20 is permitted to enter the facility 10, the remote server computer 50 may transmit an instruction to the user device 24 instructing the user to drive the vehicle 20 to a waiting area 160.

Figure 5:
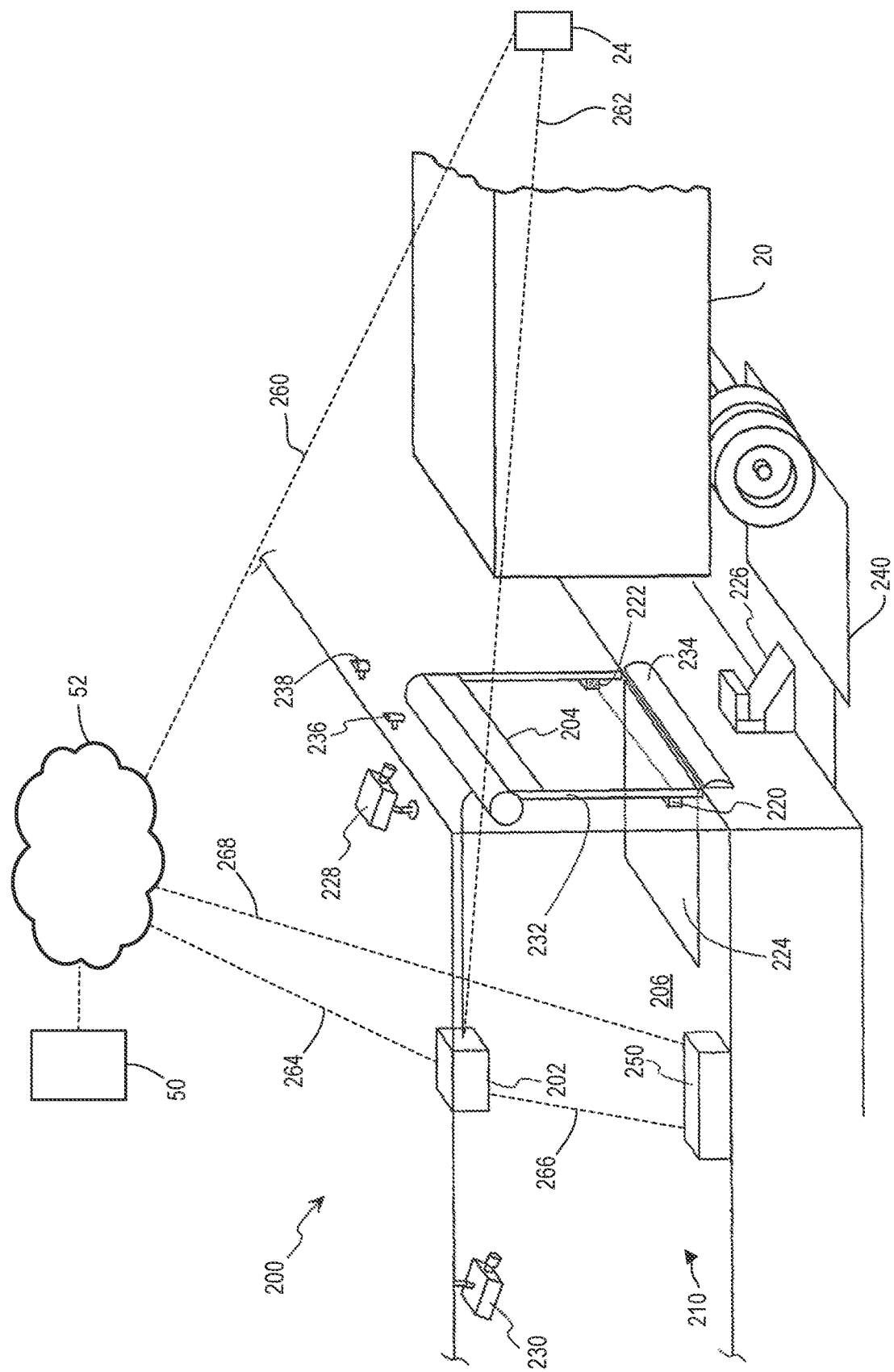
FIG. 5 is a schematic diagram showing an example loading dock of the facility of FIG. 1.

Referring now to FIG. 5, a loading dock area 200 (which may correspond to a loading dock 14 of FIG. 1) includes a dock door operator 202 that is configured to be operatively connected to a loading dock door 204 to move the loading dock door 204 between a closed position and an open position. The loading dock door 204 shown in FIG. 5 is in the form of a roller door. In other aspects, the loading dock door 204 may be in the form of a paneled door, a swinging door, a gate, or other suitable barrier for controlling access to an interior 206 of the loading dock area 200.

The dock door operator 202 may include components that are similar to the components of the movable barrier operator 40 discussed with respect to FIG. 2. For example, the dock door operator 202 includes a motor, communication circuitry, a memory, and a processor. The dock door operator 202 is configured to communicate via communication circuitry thereof with the remote server computer 50 over the network 52.

The loading dock area 200 may include one or more loading dock components, indicated generally at 210. Example loading dock components 210 include a photo beam system 220 including an emitter 222, a safety edging of the door 204, a dock leveler 224, a vehicle restraint 226 (e.g., a trailer lock), an exterior camera 228, an interior camera 230, edge guards or dock seal 232, dock bumper 234, an optical detector 236 (e.g., a camera or light time-of-flight sensor), a sensor 238 (e.g., a passive infrared (PIR), ultrasonic, and/or microwave sensor), and a loop detector 240. One or more of the loading dock components 210 may be in communication (e.g., wired or wireless communication) with one or both of the dock door operator 202 and a gateway device 250. The gateway device 250 may be a communications hub that is in communication with the various loading dock components 210 and one or both of the dock door operator 202 and the remote server computer 50, but is not configured to move the loading dock door 204.

In one embodiment, the remote server computer 50 may send a control command to the dock door operator 202 and/or the gateway device 250 to configure at least one component of the loading dock components 210 to facilitate receiving the vehicle 20 at the loading dock area 200. Such a control or configuration command may be issued, for example, upon the conclusion of one or both of the check-in process and the presence verification process, and/or upon the remote server computer 50 causing the movable barrier operator 40 to move the movable barrier 32.

The one or more of the loading dock components 210 may be configured based at least in part on at least one characteristic of the vehicle 20. In one example, the remote server computer 50 may communicate a control command to cause a height adjustment of the dock leveler 224. The height adjustment may be based on a known height of a floor of the trailer associated with the vehicle 20 (e.g., as indicated by the check-in communication 130). In this way, the dock leveler 224 may provide an appropriate transition from a floor of the interior 206 of the loading dock area 200 to the load space associated with the vehicle 20. In still another example, the remote server computer 50 may communicate a control command to cause an adjustment of the operation of the vehicle restraint 226, such as adjusting an orientation of a vehicle restraint hook or adjusting automated wheel chocks. As an example, the control command may cause an actuator to shift a carriage of the vehicle restraint 226 up or down along a vertical track of the vehicle restraint 226. When the carriage has been shifted to the height requested by the control command, the hook of the vehicle restraint 226 is positioned to pivot up and over the rear impact guard of the vehicle 20 to secure the vehicle 20 at the loading dock.

Upon the vehicle 20 arriving at the particular loading dock area 200, a "dock arrival" process is performed. More particularly, the remote server computer 50 may receive (e.g., at the communication interface 90) a dock arrival communication 260 from the user device 24 indicating arrival of the vehicle 20 at the particular loading dock area 200. In one embodiment, the dock arrival communication 260 is transmitted when a vehicle occupant opens and/or controls an application of the user device 24 via the user input 100 (e.g., via a touch screen). In this way, the vehicle occupant may manually effect transmission of the dock arrival communication 260 from the user device 24 upon arriving at the loading dock area 200. According to another aspect, the user device 24 may automatically effect transmission of the dock arrival communication 260. In this aspect, transmission of the dock arrival communication 260 may be effected in response to the processor circuit 118 determining (e.g., via location circuitry 112) that the user device 24 is at a predetermined geolocation or proximity relative to the loading dock area 200 (e.g., proximate the loading dock door 204). In one approach, the dock arrival communication 260 is communicated to the remote server computer 50 via the network 52. In another approach, the dock arrival communication 260 is communicated to the dock door operator 202 and/or the gateway device 250 for communication to the remote server computer 50 via the network 52.

Upon receiving the dock arrival communication 260, the remote server computer 50 may perform a dock presence verification process. More particularly, the remote server computer 50 may communicate (e.g., via the communication interface 90) with one or more devices at the loading dock area 200 to verify the vehicle 20 has arrived at the loading dock area 200.

In one aspect, the remote server computer 50 may communicate with the dock door operator 202 for verification of vehicle presence at the loading dock area 200. The dock door operator 202 and/or the gateway deice 250 may be informed of a presence of the vehicle 20 at the loading dock area 200 through various approaches. In one approach, the dock door operator 202 and/or the gateway device 250 communicates with one or more of the loading dock components 210.

In one example, verification of the presence of the vehicle 20 may include detecting a break in an optical beam transmitted by a photo beam system 220. In another example, verification of the presence of the vehicle 20 may include detecting a change in the base frequency of the electrical signal transmitted by the loop detector 240. Other sensors and loading dock components 210, discussed above, may be used for detecting the presence of the vehicle 20 at the loading dock area 200.

In another approach, the dock door operator 202 is configured to directly detect a presence of a vehicle 20 at the loading dock area 200. For example, the communication circuitry of the dock door operator 202 may communicate with the user device 24, as indicated at signal 262. Such communication may be, for example, via a short-range protocol (e.g., Bluetooth).

As such, at least one of the dock door operator 202 and the gateway device 250 is informed of a presence (or absence as informed or inferred) of a vehicle 20 at the loading dock area 200. In one aspect, the dock door operator 202 is configured to transmit a dock verification communication 264 to the remote server computer 50. The dock verification communication 264 may be transmitted in response to, for example, the dock door operator 202 receiving a presence indication from a loading dock component 210 or the user device 24, or in response to receiving a signal 266 from the gateway device 250. Additionally or alternatively, the gateway device 250 may transmit a dock verification communication 268 to the remote server computer 50.

In still another aspect, one or more of the loading dock components 210 may communicate a verification communication to the remote server computer 50 independently of the dock door operator 202 and gateway device 250 (e.g., via the network 52). In this way, a loading dock component 210 may include a wired or wireless network interface.

In one approach, a loading dock component 210 may continuously or periodically monitor for the presence of a vehicle 20. In another approach, the loading dock component 210 may enter a "sleep" mode, and may check for the presence of a vehicle 20 in response to a "wake" signal transmitted from the dock door operator 202, the gateway device 250, the remote server computer 50 (e.g., as part of the presence verification process), and/or the user device 24. For example, the dock door operator 202 or gateway device 250 may be configured to transmit a wake signal to the loading dock component 210 in response to receiving a vehicle presence query from the remote server computer 50.

The various approaches described herein allow for the remote server computer 50 to be informed of a presence of a vehicle 20 at the loading dock area 200. Upon the remote server computer 50 receiving the dock arrival communication 260 from the user device 24 and a dock verification communication 264 from the dock door operator 202 and/or a dock verification communication 268 from the gateway device 250, the remote server computer 50 may be configured to cause the dock door operator 202 to move the loading dock door 204 from a closed position to an open position whereby access to the interior 206 of the loading dock area 200 is achieved. The remote server computer 50 may cause the dock door operator 202 to move the loading dock door 204 by communicating a control command to the dock door operator 202. Furthermore, the remote server computer 50 may receive, from the dock door operator 202, an indication of the dock door operator 202 moving the loading dock door 204 between closed and open positions. The "open time," which corresponds to the dock door operator 202 moving the loading dock door 204 between a closed and an open position, may be stored in a memory at one or both of the dock door operator 202 (memory 72) and the remote server computer 50 (memory 92). The open time recorded for the operation of the dock door operator 202 may be utilized as an electronic signature that permits the system 5 to independently verify the vehicle 20 is at the loading dock 14.

In one approach, the remote server computer 50 may further be configured to store, in the memory 92, a "close time" that corresponds to the dock door operator 202 moving the loading dock door 204 between an open and a closed position. The close time may be indicative of the vehicle 20 leaving the loading dock area 200. Furthermore, the remote server computer 50 may be configured to store, in the memory 92, a "departure time" that corresponds to the movable barrier operator 40 moving the movable barrier 32 of the facility 10 between a closed position and an open position to permit the vehicle 20 to exit the facility 10. The departure time may be indicative of the vehicle 20 leaving the facility 10 via the movable barrier 32 and may provide an electronic signature the system 5 may use to independently track movement of the vehicle 20 and freight therein. In this way, arrival, duration of stay, and departure times for a particular vehicle 20 or particular freight transport may be logged and maintained. Such information may be informative of the shipping/receiving performance of the facility and/or timeliness/efficiency of the transportation carrier or vehicle driver/operator, and useful at least in part to determine whether fees or charges are to be assessed e.g. for detention, etc.

As part of the check out process, the remote server computer 50 may initiate freight billing and/or initiate a completed bill of lading. The check out process may involve providing freight information, such as a new or updated bill of lading, for the products loaded onto the vehicle 20 at the facility 10 to the remote server computer 50 and/or user device 24. The new freight information is associated with the user's profile until the user has delivered the freight to the assigned facility. Alternatively or additionally, the check out process may involve the remote server computer 50 generating a notification that the driver is available to pickup a new freight load.

In one aspect, the remote server computer 50 may transmit one or more notifications to a computing device (e.g., a desktop, laptop, smartphone, or tablet) at the facility 10 reporting the activity of the vehicle 20 or various components of the facility 10. Such reporting notifications may be transmitted during the "check-in" process and/or during the "dock arrival" process. For example, the remote server computer 50 may transmit reporting notifications in response to receiving the check-in communication 130 (such that personnel at the facility 10 are notified of the arrival of the vehicle 20 at the movable barrier 32), in response to receiving the verification communication 140, 140', in response to commanding the movable barrier operator 40 to move the movable barrier 32, and/or in response to a sensor 60 confirming the vehicle has entered the secured premises 16. The remote server computer 50 may also or may instead transmit reporting notifications in response to receiving the dock arrival communication 260 (such that personnel at the facility 10 are notified of the arrival of the vehicle 20 at the loading dock area 200), in response to receiving a dock verification communication 264, 268, and/or in response to commanding the dock door operator 202 to move the loading dock door 204.

Figure 6:
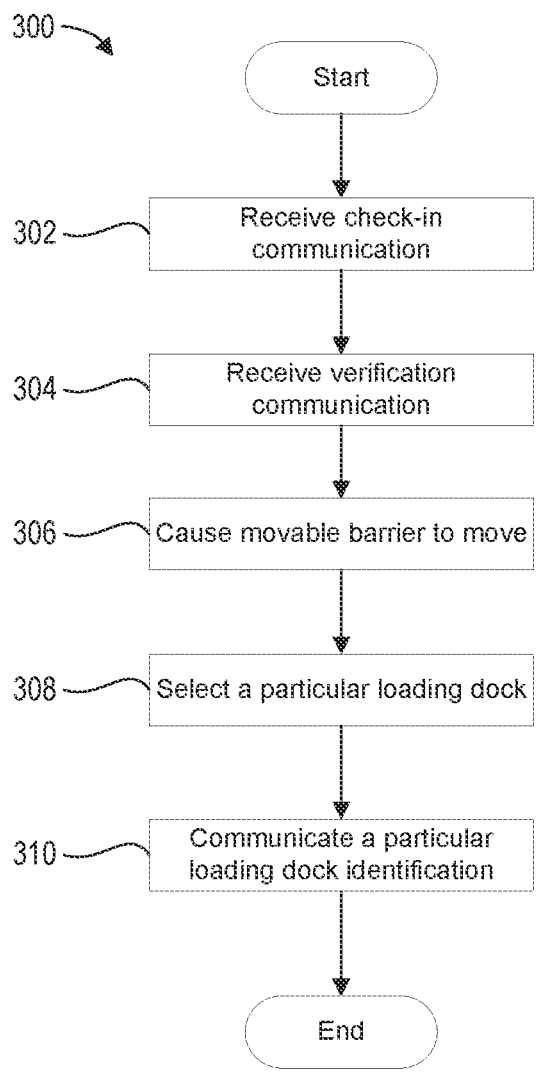
FIG. 6 is a flow chart of an example method that includes controlling access at the facility of FIG. 1.

Referring now to FIG. 6, a method 300 for controlling access to a facility including a movable barrier (e.g., movable barrier 32) and a plurality of loading docks (e.g., loading docks 14) is described. One or more of the steps described with respect to method 300 may occur at, or may be performed by, one or more of the remote server computer 50, movable barrier operator 40, dock door operator 202, gateway device 250, and the user device 24.

The method 300 includes receiving 302, from a user device (e.g., user device 24) associated with a vehicle (e.g., vehicle 20), a check-in communication that includes a check-in identifier. The check-in identifier may indicate at least one characteristic of the vehicle, a user of the user device, the user device, and/or freight in the vehicle. The at least one characteristic of the vehicle may relate to, for example, a height of the vehicle or to a configuration of a rear impact guard of the vehicle.

The method 300 further includes receiving 304 a verification communication that verifies a presence of the vehicle relative to a sensor (e.g., sensor 60) associated with the movable barrier.

The method 300 further includes causing 306 a movable barrier operator (e.g., movable barrier operator 40) associated with the movable barrier to move the movable barrier between closed and open positions in response to the check-in identifier indicating authorization to access the facility and in response to receiving the verification communication.

The method 300 further includes selecting 308 a particular loading dock from the plurality of loading docks. The method 300 further includes communicating 310 a loading dock identification representative of the particular loading dock to the user device to direct the vehicle to the particular loading dock.

In one embodiment, the method 300 may further include causing the particular loading dock to configure at least one component of the particular loading dock, according to the at least one characteristic of the vehicle to facilitate receiving the vehicle at the particular loading dock. For example, the method 300 may include adjusting a height of a leveler of the particular loading dock or adjusting the position of a restraint of the particular loading dock.

The approaches described herein may promote efficiency in various aspects of the operation of the facility 10. For example, because the facility 10 may be notified of the arrival of a vehicle 20 prior to the vehicle 20 entering the facility 10, facility personnel may assign and prepare the loading dock 14 in advance of the vehicle 20 arriving at the loading dock 14. This may reduce delays in initiating a loading or unloading process at the loading dock 14. Furthermore, a check-in process may be performed at any time of day such that a vehicle operator may deliver and drop off a trailer to the facility 10 outside of typical business hours. Furthermore, performance of both vehicle users and facilities may be logged and monitored over time. Still further, because the remote server computer 50 may store freight information provided by check-in communications 130, the approaches described herein may provide increased traceability of freight.

While there have been illustrated and described particular embodiments of the present invention, it will be appreciated that numerous changes and modifications will occur to those skilled in the art, and it is intended for the present invention to cover all those changes and modifications which fall within the scope of the appended claims. It is intended that the phrase "at least one of" as used herein be interpreted in the disjunctive sense. For example, the phrase "at least one of A and B" is intended to encompass only A, only B, or both A and B.

What is claimed is:

1. A method for controlling access to a facility that includes a movable barrier and a plurality of loading docks, the method comprising:
   receiving, from a user device associated with a vehicle, a check-in communication that includes a check-in identifier;
   receiving a verification communication that verifies a presence of the vehicle relative to a sensor associated with the movable barrier;
   causing a movable barrier operator associated with the movable barrier to move the movable barrier between closed and open positions in response to the check-in identifier indicating authorization to access the facility and in response to receiving the verification communication;
   selecting a particular loading dock from the plurality of loading docks; and
   communicating, to the user device, a loading dock identification representative of the particular loading dock to direct the vehicle to the particular loading dock.

2. The method of claim 1 wherein the check-in identifier indicates at least one characteristic of the vehicle; and
   causing the particular loading dock to configure at least one component of the particular loading dock, according to the at least one characteristic, to receive the vehicle.

3. The method of claim 2 wherein the at least one characteristic of the vehicle includes a height of the vehicle, and wherein causing the particular loading dock to configure the at least one component of the particular loading dock to receive the vehicle includes adjusting a height of a leveler of the particular loading dock.

4. The method of claim 2 wherein the at least one characteristic of the vehicle relates to a rear impact guard of the vehicle, and wherein causing the particular loading dock to configure the at least one component of the particular loading dock to receive the vehicle includes adjusting operation of a restraint of the particular loading dock.

5. The method of claim 1 further comprising causing a dock door operator of the particular loading dock to move a dock door of the particular loading dock between closed and open positions.

6. The method of claim 1 wherein selecting the particular loading dock from the plurality of loading docks includes selecting the particular loading dock from the plurality of loading docks based at least in part on usage patterns of the plurality of loading docks.

7. The method of claim 1 further comprising:
   receiving, from the user device, a dock arrival communication indicating arrival of the vehicle at the particular loading dock;
   receiving, from a sensor of the particular loading dock, a dock verification communication confirming arrival of the vehicle at the particular loading dock; and
   causing a dock door operator associated with the particular loading dock to move a dock door of the particular loading dock between closed and open positions upon receipt of the dock arrival communication and receipt of the dock verification communication.

8. The method of claim 1 further comprising determining at least one of whether the check-in identifier indicates authorization to access the facility, and
   determining whether the check-in identifier indicates authorization to access the facility at a particular time.

9. The method of claim 1 further comprising receiving a freight identifier associated with the vehicle; and
   wherein causing the movable barrier operator associated with the movable barrier to move the movable barrier between closed and open positions includes causing the movable barrier operator to move the movable barrier in response to the freight identifier indicating authorization to enter into the facility.

10. The method of claim 1 further comprising:
    storing, in a memory, an entrance time corresponding to the movable barrier operator moving the movable barrier between closed and open positions;
    receiving, from a dock door operator of the particular loading dock, an indication of the dock door operator moving a dock door of the particular loading dock between closed and open positions; and
    storing, in the memory, a dock operation time corresponding to the dock door operator moving the dock door between the closed and open positions.

11. The method of claim 1 wherein causing the movable barrier operator to move the movable barrier between closed and open positions includes communicating a control command to the movable barrier operator to cause the movable barrier operator to move the movable barrier between closed and open positions.

* * * * *